May 23, 1967
C. W. TITTLE
3,321,627
GAMMA-GAMMA WELL LOGGING COMPRISING A COLLIMATED
SOURCE AND DETECTOR
Original Filed Feb. 19, 1953
2 Sheets-Sheet 1
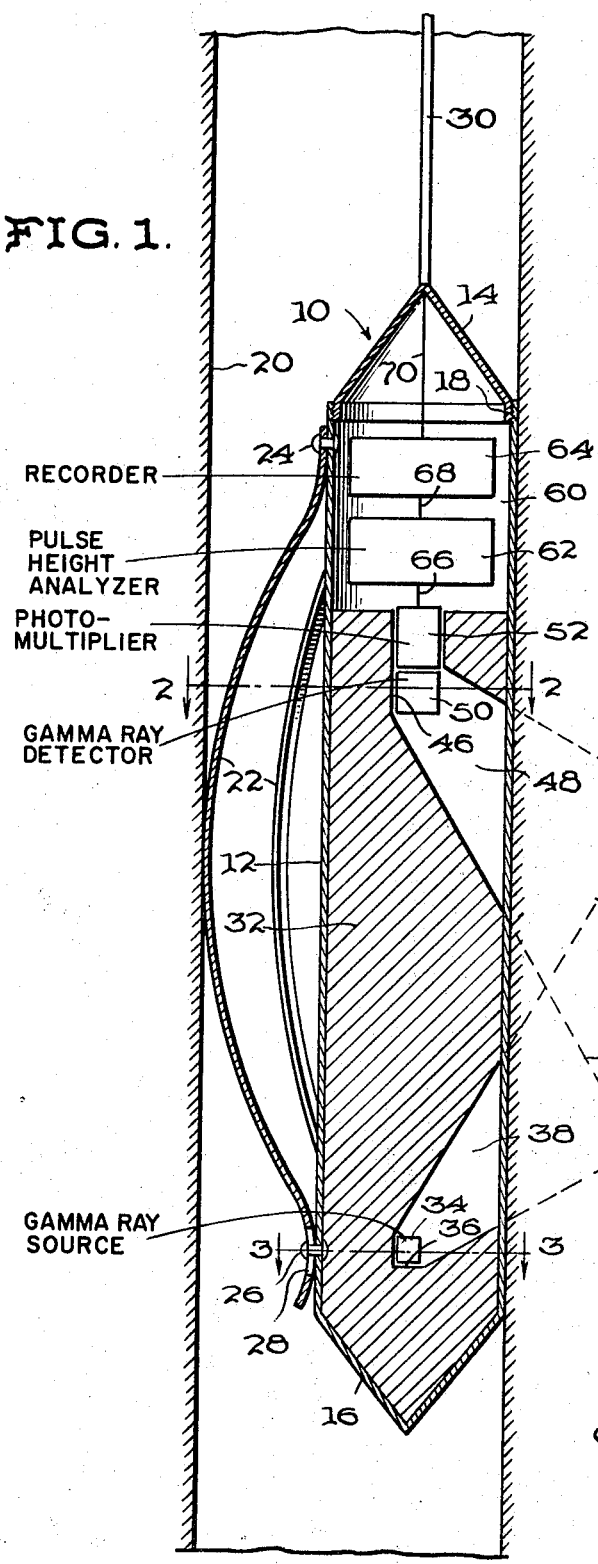
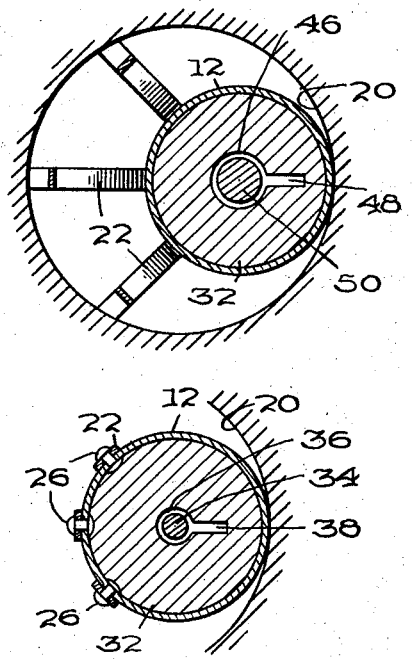
INVENTOR.
CHARLES W. TITTLE
BY
Horace S. Cooke
ATTORNEY

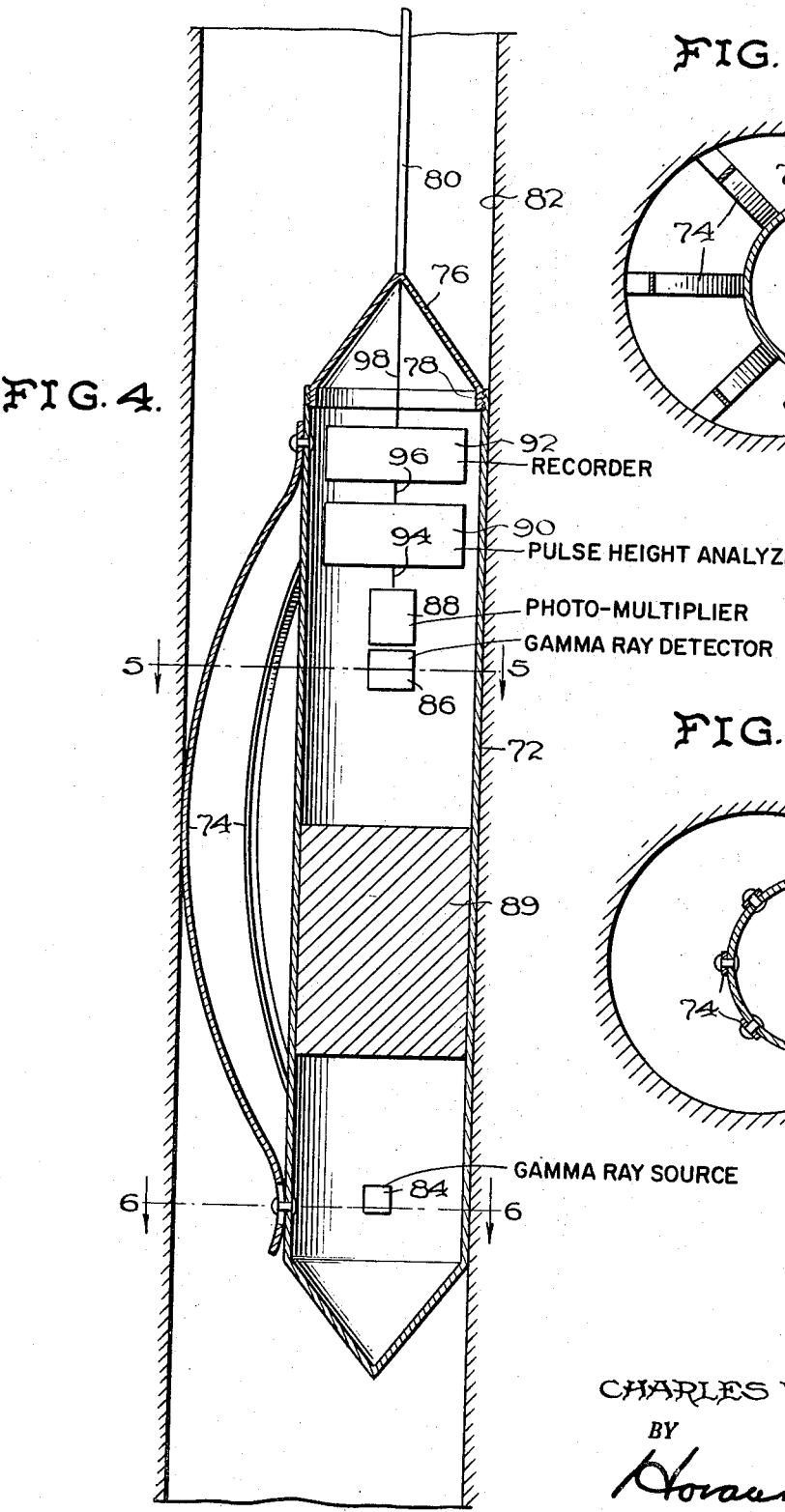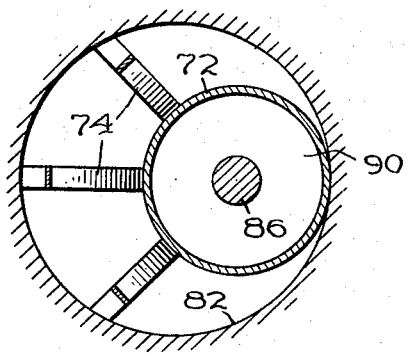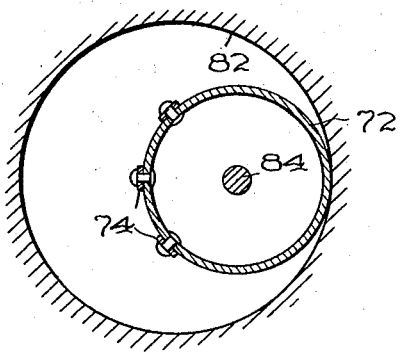

United States Patent Office 3,321,627
Patented May 23, 1967

3,321,627
GAMMA-GAMMA WELL LOGGING COMPRISING A COLLIMATED SOURCE AND DETECTOR
Charles W. Tittle, Oakmont, Pa., assignor to Schlumberger Limited (Schlumberger N.V.), Houston, Tex., a corporation of the Netherlands Antilles
Continuation of application Ser. No. 337,828, Feb. 19, 1953. This application Oct. 7, 1966, Ser. No. 586,598
18 Claims. (Cl. 250—83.3)

This application is a continuation of application Ser. No. 337,828, filed Feb. 19, 1953.

This invention relates to new and useful improvements in borehole logging methods and apparatus, and more specifically pertains to a method of obtaining a gamma-gamma log of a borehole and apparatus for practicing such method.

The subject invention is somewhat related to the invention disclosed in U.S. application Ser. No. 312,678, Epithermal Neutron Logging Method Using Collimation, filed Oct. 2, 1952, now Patent No. 2,769,918, and assigned to the same assignee.

As is known, the extent to which gamma-rays are scattered and absorbed upon passing through matter is primarily a function of the density of such matter and, to a much lesser degree, the elements present in such matter. Based upon this fact, it has heretofore been proposed that an indication of the density of a material may be obtained by measuring the extent to which gamma-rays are scattered upon passing into such material.

However, various difficulties may be encountered in the practice of proposals heretofore made for density determination by the measurement of scattered gamma-rays, particularly in the application of such a technique to borehole logging where such a great variety of substances and conditions are present. Among such difficulties may be mentioned the masking of results by gamma radiation passing directly from the source of gamma-rays to the gamma-ray detector.

Background gamma radiation, sensed by the gamma-ray detector as scattered gamma-rays, is an obvious source of erroneous results. Such undesirable effect of background gama radiation is especially aggravated in boreholes, inasmuch as the latter penetrates earth formations of varying composition and radioactive content so that the background gamma radiation level or the intensity of natural gamma-rays, as such radiation is commonly referred to, varies throughout the depth of a borehole.

Furthermore, practice of density determination by the gamma-gamma method according to prior proposals would not give the desired sharp delineation of a boundary between earth formations of differing densities, and, in fact, it is entirely probable that the presence of a formation of distinctive density that is thin relative to the dimensions of the logging apparatus would not be clearly indicated, much less the thickness and density of the same. This lack of selectivity as to the volume of matter "sampled" inherent in prior proposals resides to a large degree in the fact that the gamma-ray detector is so disposed as to respond to gamma-rays passing towards the same from any direction within a very large solid angle having its apex at the detector.

The paramount aim of the instant invention is to surmount, or at least minimize the aforementioned difficulties by the provision of a method and apparatus for directing a small solid angle beam of gamma-rays into the material undergoing density determination, and limiting the access of gamma-rays to the gamma-ray detector to a small solid angle that intersects the aforesaid small solid angle beam of gamma-rays within said material.

A further purpose of this invention, in accordance with the above-mentioned aim, is to implement the discrimination between scattered gamma-rays and other gamma-rays achieved by gamma-ray collimation, by recording or indicating only those gamma-rays detected by the gamma-ray detector that possess such energies as correspond to that of the Compton-degraded quanta of the incident gamma-rays which have been scattered into the range of angles to which the gamma-ray detector is exposed.

Another important purpose of this invention is to provide gamma-gamma logging apparatus of such character that scattered gamma radiation from within a limited portion of the volume of irradiated material is preferentially recorded as compared to all other gamma radiation incident to the gamma-ray detector.

Important features of the invention insolve the provision of a gamma-ray detector possessing good energy resolution characteristics for use with a pulse-height analyzer, whereby only gamma-rays of Compton-degraded quanta for the particular angle involved may be indicated or recorded.

A further feature resides in the provision of a positioning device that maintains the side of the apparatus through which gamma-rays pass pressed against the wall of the borehole, so that the volume of matter "sampled" is always a uniform distance from the borehole, and so that a given size of apparatus may be used in boreholes of different diameters.

The invention will be best appreciated and is described in connection with the accompanying drawings, wherein:

FIGURE 1 is a vertical, central sectional view of the apparatus, wherein the same is shown in operative position within a sectional borehole; the gamma-ray source and the scintillation counter being shown in side elevations; the pulse-height analyzer, the recorder, and related circuitry being shown in block diagram; and the vertical extent of the primary gamma-ray source beam and the vertical extent of gamma-ray collimation towards the gamma-ray detector being shown in dashed lines;

FIGURE 2 is a horizontal sectional view, this view being taken upon the plane of the section line 2—2 in FIGURE 1 to illustrate the relation of the sensitive element of the gamma-ray detector to its collimation slot;

FIGURE 3 is a horizontal sectional view taken upon the plane of section line 3—3 in FIGURE 1 to illustrate the relation of the gamma-ray source and its collimation slot;

FIGURE 4 is a vertical, central sectional view of a modified form of the apparatus, wherein the same is shown in operative position in a borehole; and, FIGURES 5 and 6 are horizontal sectional views taken upon the planes of the respective section lines 5—5 and 6—6 in FIGURE 4.

Reference is first directed to the form of the invention shown in FIGURES 1–3, wherein the gamma-gamma logging apparatus, designated generally at 10, comprises a hollow cylindrical shell or casing 12 that is closed at its upper and lower ends by conical end walls 14 and 16, respectively. The end wall 14 is removably threaded, as at 18, to the casing 12 to permit access to the interior thereof. The casing 12 may be formed of steel or aluminum, for example, or of any metal such that the wall thickness of the casing 12 will not attenuate gamma-rays to an excessive extent.

As shown in the drawings, one side of the casing 12 is pressed against the wall of the borehole 20 by means of a plurality of circumferentially spaced arcuate spring steel strips 22 that have their upper and lower ends secured respectively to the casing by rivets 24 and 26. The lower portions of the spring strips 22, through which the rivets 26 pass, are slotted longitudinally, as at 28, to permit biased outward movement of the central portions of the spring strips 22 into contact with the wall of the borehole 20. The arrangement is such that the spring strips 22 flex resiliently to maintain the casing 12 in contact with the wall of the borehole 20, despite substantial variations in the diameter of the borehole 20.

The apparatus 10 may be moved vertically in the borehole 20 by means of a cable 30 that is secured by any suitable means, not shown, to the end wall 14 of the casing 12. Thus, conventional equipment at the surface of the earth may act upon the cable 30 to control the vertical position and movements of the apparatus 10. For reasons subsequently to become apparent, the cable 30 is of a conventional composite type that includes electrical conductors.

A massive, generally cylindrical block of gamma-ray shielding material 32 is disposed in the casing 12, and may comprise any of the known materials effective for markedly attenuating gamma-rays, such as lead, bismuth, high tungsten alloys, and the like.

A gamma-ray source 34 is disposed in cavity 36 formed centrally of the lower portion of gamma-ray shielding material 32. The cavity 36 has communication with the exterior of gamma-ray shielding material 32 by means of a thin, fan-shaped slot 38 that is directed upwardly and outwardly from the gamma-ray source 34. The arrangement is such that gamma-rays from the gamma-ray source 34 are collimated into a narrow, fan-shaped beam that passes outwardly from the collimating slot or opening 38, through the wall of the casing 12, and into the surrounding earth formations 40. The general upper and lower of the limits primary gamma-ray source beam within the earth formations 40 are indicated by dashed lines denoted at 42 and 44, respectively, in the drawings. It is to be noted that the slot 38 opens from the gamma-ray shielding material 32 at the side of the casing 12 pressed into contact with the wall of the borehole 20 by the spring strips 22.

A number of gamma-ray sources are known that may suffice for the gamma-ray source 34, such as a substance that contains a radioactive element productive of gamma-rays in its decay, or a source may be employed that depends on neutron capture to produce gamma-rays such as disclosed in U.S. application Ser. No. 312,677, High Energy Gamma-Ray Source, filed Oct. 2, 1952, now abandoned, and assigned to the same assignee as the subject invention.

A central cavity 46 is provided adjacent the upper end of the gamma-ray shielding material 32, such cavity 46 being for the purpose of receiving a gamma-ray detector. A gamma-ray collimating slot or opening 48, similar to and coplanar with the collimating slot 38, is provided that opens fan-like downwardly and outwardly from the cavity 46 to the exterior of the gamma-ray shielding 32.

A variety of gamma-ray detectors is known in the art, such as conventional proportional counters, and may be employed with varying degrees of efficiency in the present invention; however, the scintillation-type of gamma-ray detector is preferred for use in the present invention, primarily because of the excellent energy resolution obtainable thereby. Accordingly, the invention is illustrated and described solely in connection with the use of a scintillation-type gamma-ray detector, as the manner of substituting other types of gamma-ray detectors therefor will be instantly apparent to those skilled in the art. The scintillation counter preferred for use in the invention comprises a gamma-ray sensitive phosphor 50 and a photomultiplier tube 52 optically coupled to the phosphor 50.

The phosphor 50 is preferably of the thallium-modified sodium iodide type, because of the very efficient energy resolution obtainable thereby, and is so disposed in the cavity 46 as to be in alignment with the collimating slot 48. The arrangement is such that the shielding material 32 attenuates substantially all gamma-rays passing towards the phosphor or gamma-ray sensitive element 50 except those within the limited solid angle defined by the collimating slot 48. The general upper and lower limits of such limited solid angle within the region of the earth formations 40 are indicated by dashed lines 54 and 56, respectively.

Inasmuch as the collimating slots 38 and 48 are coplanar, it will be evident upon inspection of FIGURE 1 and particularly the dashed lines 42, 44, 54 and 56 that the solid angles defined by such slots intersect in such a manner that a quadrangular-shaped volume indicated at 58 is common to each of the solid angles. The importance of the fact that only from points within the volume 58 can straight lines be drawn to both the gamma-ray source 34 and the phosphor 50 that do not pass through any portion of the gamma-ray shielding material 32 will become apparent in connection with the operation of the invention to be presently set forth.

The photomultiplier tube 52 is also positioned in the cavity 46 and is disposed above the phosphor 50 out of alignment with the collimating slot 48. The cavity 46 may open through the upper end of the shielding material 32, as shown, to permit convenient access to the phosphor 50 and the photomultiplier tube 52, or if preferred, the cavity 46 may terminate short of the upper end of the shielding material 32 for more effective shielding of the phosphor 50.

In the volume 60 within the casing 12 and above the shielding material 32, there is disposed a pulse-height analyzer circuit and a recorder, such elements being illustrated diagrammatically, and designated at 62, and 64, respectively. Optionally, however, either the recorder 64 or the recorder 64 and the pulse-height analyzer circuit 62 may be situated at the surface of the earth. In any event, conventional electrical circuit means is provided to interconnect and energize the photomultiplier tube 52, the pulse-height analyzer circuit 62 and the recorder 64. Such circuit means are indicated diagrammatically in FIGURE 1 at 66, 68 and 70, with the latter numbered portion of such means serving to supply electrical energy from the surface of the earth through the electrical conductors included in the cable 30, as well as electrical signals of vertical position of the apparatus 10 to the recorder.

Should it be desired that the pulse-height analyzer circuit 62 and the recorder 64 be positioned at the surface of the earth, appropriate direct connections between such equipment and the photomultiplier tube 52 would be made through the electrical conduits included in the cable 30.

The pulse-height analyzer or selector circuit 62 may be of any conventional type for selecting and passing only a certain range of pulse heights from pulses introduced thereto, and may, of course, include an amplifier if deemed necessary.

Numerous electronic and mechanical means are known to the borehole logging art generally for correlating the particular nature of data sought with the vertical position of the sensing or detecting device. Since such means do not per se constitute or form a part of the instant invention, and since illustration and description of any of such conventional means is not necessary to a complete understanding of the present invention, such means are neither illustrated nor described herein. Suffice it to state that the present invention is adapted for use with such means, whereby signals received by the recorder 64 from the analyzer circuit 62 may be correlated with the corresponding vertical position of the apparatus 10 at the time of reception for recordation by the recorder 64.

In the light of the foregoing description, the operation of the invention will be readily understood. Gamma-rays emitted by the source 34 are to a substantial extent collimated into a narrow beam that passes through the volume 58 in the earth formations 40. The direct or straight line gamma radiation from the source 34 that constitutes such collimated beam of gamma-rays will produce scattered gamma-radiation within the formations 40 to an extent largely dependent upon the density of the formations 40 thereby traversed. Of all of the scattered or secondary gamma radiation thus produced, it will be evident upon inspection of FIGURE 1 that only such gamma-rays as originate within the volume 58 may pass in a straight line to the phosphor or gamma-ray sensitive element 50 without traversing some portion of the shielding material 32.

Thus, in view of the mass of shielding material 32 interposed between the source 34 and the phosphor 50, the collimation system comprised of the slots 38 and 48 strongly favors the phosphor 50 being affected by only such portion of gamma-ray energy emanating from the source 34 as is scattered within the volume 58 of the earth formations 40. The viewpoint may therefore be taken that the gamma-ray actuation of the phosphor 50 is a function of volume 58, that is, the limited volume of the earth formation undergoing test or density measurement. The gamma-ray flux reaching the sensitive element of the detector is also a function of the density and volume of material between the source 34 and the volume 58, and between the volume 58 and the phophor 50, by virtue of scattering and absorption of gamma-rays in these regions. Therefore, the response is not wholly a function of volume 58, but to a major degree will be a function of volume 58. Although the gamma-rays reaching the phosphor 50 arise by scattering almost solely in the volume 58, their intensity depends on the other material in the effective path between the source 34 and the phosphor 50.

The selectivity of the gamma-ray detector for scattered gamma-rays originating solely within the limited volume 58 achieved by the collimating slots 38 and 48 is still further enhanced by a method of operating the apparatus 10 in such a manner that, to a marked degree, only such above-mentioned scattered gamma-rays, as distinguished from all other gamma-rays affecting the phosphor 50, are recorded by the recorder 64. This superior method of operating the apparatus 10 comprises operating the pulse-height analyzer circuit 62 in such a manner as to select for recordation by the recorder 64 only those pulses from the photomultiplier tube 52 that lie in certain range of pulse heights.

Gamma-rays that proceed from the source 34 to volume 58 and are therein scattered directly to the phosphor are degraded in energy by the Compton-effect to an extent dependent upon the angle of the travel path of the scattered gamma-ray relative to the travel path of the incident gamma-ray. Obviously, the possible range in value for such angles is limited by physical configuration and relative angle of the slots 38 and 48 to each other. Therefore, for a given gamma-ray source and collimating slot arrangement, the Compton-degraded quanta of gamma-rays scattered within the volume 58 and striking the phosphor 50 lie within a predetermined energy range, and consequently result in pulse heights from the photomultiplier tube 52 that lie within a predetermined range. It is to this predetermined range of pulse heights from the photomultiplier tube 52 that the pulse-height analyzer or selector circuit 62 is preset to be selective for controlling the recorder apparatus 64.

With the apparatus disclosed, when operated in the described manner, reliable data as to the extent to which gamma-rays are scattered within a limited volume of earth formation may be obtained, which extent of scattering is an indication of the density of such volume of earth formation.

In use of the apparatus 10, the casing 12 and its contents may be progressively moved along the borehole 20 while correlating data obtained with the vertical position of the casing 12, or the casing 12 may be moved from first one to another vertical position in the borehole 20 and data obtained while the casing 12 is stationary at each position. Considerable flexibility in the manner of use exists in this respect.

It is to be noted that the spring strips 22 maintain the casing 12 pressed against the wall of the borehole 20 in such a fashion that the volume 58 does not overlap the borehole 20. The purpose of this arrangement is to reduce the influence of the borehole fluid by making close contact with the formation at points lying within the angles favored by the collimating slots 38 and 48. Irregularity of the borehole wall, presence of a mud filter-cake on the borehole wall, and the presence of any borehole casing have effects on the detector response by reason of their influence on the gamma-ray intensity at the detector, and the measurements are subject to possible variation and error due to these causes.

Greater logging speed may be obtained in the use of the apparatus shown in FIGURE 1 by modifying the shape of the slots 38 and 48 so that they are divergent outwardly in the horizontal sense as well as in the vertical sense. In other words, the vertical side walls defining the slots 38 and 48, which are shown as being closely spaced and parallel in FIGURES 2 and 3, may be divergent outwardly towards the casing 12 in order to increase the speed at which satisfactory logging may be accomplished. Such permissible increase in logging speed is realized as a consequence of the greater number of gamma-rays permitted to pass through the larger collimation slots.

Although the gamma-ray detector has been illustrated as disposed above the gamma-ray source, the relative positions thereof may obviously be reversed with appropriate arrangement of the collimating slots; however, the illustrated arrangement is preferred for the reason that less electrical wiring is required. It is emphasized that the location of the pulse-height analyzer and the recorder is generally arbitrary and is largely a matter of convenience and discretion with the user. The advantage of placing the pulse-height analyzer near the photomultiplier tube may be equally well obtained when the former is at the surface of the earth by placing an amplifier in the casing 12 and interposing the same electrically between the photomultiplier tube and the pulse-height analyzer.

Attention is now directed to the simpler form of the invention shown in FIGURES 4–6, wherein there is provided a casing 72 and spring strips 74 that correspond in purpose and function to the elements 12 and 22 shown in FIGURE 1.

Similarly, the casing 72 is provided with an upper conical end wall 76 that is threadedly secured to the casing 72 as at 78. In addition, a supporting cable 80 is secured to the end wall 76 in any suitable manner, whereby the casing 72 may be raised and lowered within the borehole 82. Like the cable 30 shown in FIG. 1, the cable 80 is of the type that includes provision for one or more electrical conductors therein.

The gamma-ray source 84 is centrally disposed within the lower portion of the casing 72 and comprises a gamma-ray emitting material, such as has been previously described in connection with the gamma-ray source 34 shown in FIG. 1, a mono-energetic source being preferred.

Gamma-ray detecting means are provided which take the form of a scintillating phosphor 86 and a photomultiplier tube 88 that correspond to the elements 50 and 52 shown in FIG. 1.

A gamma-ray shield 89 is interposed in spaced relation between the gamma-ray source 84 and the phosphor 86. The gamma-ray shield 89 may be comprised of such material as previously described in connection with the gamma-ray shield 32 shown in FIG. 1.

The arrangement of the gamma-ray shield 89 with respect to the gamma-ray source 84 and the phosphor 86 is such that the gamma-ray shield 89 will substantially exclude direct radiation of the gamma-ray source 84 from the phosphor 86. Therefore, as in the case of the operation of the apparatus shown in FIG. 1, the radiation effects of the gamma-ray source 84 to which the phosphor 86 is subjected are substantially limited to scattered or secondary gamma radiation produced in material surrounding the casing 72. The main distinction between the operation of the apparatus shown in FIG. 4 and that shown in FIG. 1 is that in the latter case gamma-rays emitted by the gamma-ray source are collimated as are the gamma-rays striking the gamma-ray detector while no collimation is obtained in the use of the apparatus shown in FIG. 4.

Although the gamma-ray source 84 is so arranged as to irradiate a comparatively large volume of material surrounding the casing 72, means are provided in association with the gamma-ray detector for the purpose of recording substantially only such secondary or scattered gamma radiation as may be produced within a relatively limited portion of the material irradiated by the gamma-ray source 84. Such means comprises the utilization of a pulse-height analyzer circuit indicated at 90, and a recorder 92. The pulse-height analyzer 90 and the recorder 92 correspond in purpose and function to the respective elements 62 and 64 shown in FIG. 1.

It will be understood that the height of the pulses produced by the photomultiplier tube 88 will be dependent upon the energy of the gamma-ray quanta incident upon the phosphor 86. Furthermore, it will be apparent that the energy of the Compton-degraded gamma-rays incident upon the phosphor 86 will be dependent upon the angle between the direct gamma radiation from the gamma-ray source 84 and the path of the scattered gamma radiation. Therefore, with the pulse-height analyzer 90 so adjusted as to produce an electrical pulse for recordation by the recorder 92 only upon the production of an electrical pulse by the photomultiplier tube 88 within a limited height range, it will be evident that only gamma-rays incident upon the phosphor 86 of a limited range of Compton-degraded energies will be recorded.

As in the case of the operation of the apparatus shown in FIG. 1, secondary gamma radiation incident upon the phosphor 86 having energies lying within the limited energy range necessary for recordation must have paths lying within a given angular range relative to the paths of direct radiation productive of such scattered radiation. Such dependence of the recordation of gamma-rays striking the phosphor 86 upon the angular relation of direct and scattered gamma radiation limits the volume surrounding the casing 72 in which gamma-rays from the gamma-ray source 84 may be scattered so as to eventually be recorded by the recorder 92.

Thus, a selectivity in so far as recordation is concerned is obtained in the use of the apparatus shown in FIGURE 4, wherein scattered gamma radiation originating within a limited volume of the material directly irradiated by the gamma-ray source 84 is preferentially recorded as compared to other scattered radiation, and for that matter, as compared to other extraneous gamma radiation.

It is also to be noted that for a given gamma-ray source 84, the geometry of the apparatus shown in FIGURE 4 together with the adjustment of the pulse-height analyzer 90 fixes the volume and the relative position of the material outside the casing 72 that is sampled, that is, the volume of material so positioned with respect to the gamma-ray source 84 and the phosphor 86 as to be productive of Compton-degraded quanta incident upon the latter that will be recorded. The volume of material so ascertained will remain substantially constant irrespective of the vertical position of the casing 72 within the borehole 82. The importance of being able to maintain the volume of sampled material constant throughout the logging operation will be evident.

In view of the above-described manner of obtaining recording selectivity, it will be appreciated that utilization of a gamma-ray source 84 productive of mono-energetic gamma-rays, or which at least produces a large preponderance of gamma-rays of a single energy will enhance the selectivity achieved. This also holds true for the apparatus shown in FIGURE 1.

The necessary electrical circuitry for the operation of the apparatus has been illustrated diagrammatically at 94, 96 and 98, it being noted that the electrical circuitry indicated at 98 affords the necessary electrical coupling between the elements disposed within the casing 72 and apparatus located at the surface of the earth. Furthermore, it will be noted that the electrical circuitry indicated at 94 affords the necessary energization for the photomultiplier tube 88 as well as affording an electrical path for the electrical pulses produced by the photomultiplier tube 88 to the pulse-height analyzer 90. The electrical circuitry indicated at 96 affords an electrical path for pulses from the pulse-height analyzer 90 to the recorder 92.

While it is of course essential that the phosphor 86 and the photomultiplier tube 88 be disposed within the casing 72, it is optional as to whether the pulse-height analyzer 90 and the recorder 92 be disposed within the casing 72, or at the surface of the earth, as will be appreciated. In addition, as in the case of the apparatus illustrated in FIG. 1, means is provided for correlating the recordation of pulses by the recorder 92 with the corresponding vertical position of the casing 72 within the borehole 82; however, such means are neither illustrated nor described for the reason that such means are commonplace and do not in themselves constitute the subject matter of the present invention.

For purposes of clarity, supporting means for the gamma-ray source 84, as well as for the phosphor 86, photomultiplier tube 88, pulse-height analyzer 90, and the recorder 92 have been omitted from the drawings. Such provision does not constitute the subject matter of the invention, and obviously is within the capabilities of those skilled in the art.

The operation of apparatus shown in FIGURE 4 is precisely the same as that described in connection with FIGURE 1 with the exception that no collimation of gamma-rays is effected.

Further discussion of the invention is thought to be unnecessary, and although the description of the same has been quite detailed, the breadth of the invention should not be judged thereby, but rather upon reference to the scope of the appended claims.

I claim:
1. In the art of gamma-gamma borehole logging that involves subjecting earth formations to gamma-rays emanating from a gamma-ray producing zone situated within the borehole, and detecting gamma-rays in a localized detecting zone also situated in the borehole; the improvement comprising the steps of attenuating gamma-rays emanating from the gamma-ray producing zone in substantially all directions excepting a limited solid angle directed towards the earth formations, attenuating gamma-rays that are proceeding towards the detecting zone from substantially all directions excepting those passing within a limited solid angle that intersects the first-mentioned limited solid angle within the earth formations, and recording indications primarily representing those gamma-rays possessing Compton-degraded energies scattered within the volume of earth formations defined by said limited solid angles.

2. In apparatus for obtaining a gamma-gamma log of boreholes that includes a source of gamma-rays for subjecting earth formations adjacent the apparatus to gamma-rays, and a gamma-ray detector of the type productive of electrical pulses, the heights of which pulses are a function of the energy of the detected gamma-rays; the improvement comprising gamma-ray shielding means surrounding the source of gamma-rays in substantially all directions except for a limited solid angle, a gamma-ray shielding means also surrounding the gamma-ray detector in substantially all directions excepting for a limited solid angle that intersects the first-mentioned solid angle externally of the apparatus, and means for selecting from the electrical pulses produced by the gamma-ray detector for recordation primarily such pulses of a height range corresponding to detected gamma-rays possessing about the Compton-degraded energy corresponding to quanta scattered through an angle equal to the general angle of intersection of said limited solid angles.

3. Apparatus for measuring variations in porosity of earth formations traversed by a well bore comprising means for positioning a source of monoenergetic gamma-rays a predeterminable distance away from the wall of said well bore, means for collimating said gamma-rays into a beam for irradiating a predetermined portion of the formations traversed by the well bore, detecting means positioned away from the wall of said well bore and shielded to receive only gamma-rays back-scattered from a part of said irradiated portion, means for supporting said source a predetermined vertical distance from said detecting means, means for discriminating between the individual energies of the gamma-rays received at said detecting means to select only those gamma-rays lying within an energy interval of predeterminable width, said discriminating means establishing predeterminable minimum and maximum lateral distances of the effective scattering volume from the vertically disposed detecting means and source, said distances providing an optimum for said scattering volume wherein said back-scattered gamma-rays are not subject to the contents of said well bore and the walls thereof, and means for recording the total intensity of said gamma-rays within said energy interval in accordance with the depth of said detecting means and source in said well bore, as a measure of the variations in porosity of the formations traversed by the well bore.

4. The method of determining the density of an earth formation traversed by a well bore comprising the steps of traversing said well bore with a source of gamma rays, directing into a predeterminable portion of the earth formation lying vertically displaced from said source substantially monoenergetic gamma rays, simultaneously traversing said well bore with a gamma ray detector vertically displaced from both said predeterminable portion and said source, detecting the individual gamma rays back-scattered from said predeterminable portion of said formation, converting each of said gamma rays to an electrical pulse having a magnitude corresponding to the energy of each of said gamma rays, isolating a narrow band of said electrical pulses having magnitudes of a predeterminable value to establish a minimum path length for travel of the incident and back-scattered gamma rays through said formation, said path length being selected to penetrate the walls of said well bore and said formation to at least a predeterminable minimum distance, and recording the isolated pulses corresponding to said radiations of predetermined energy as a measure of the density of said earth formation.

5. A system for determining the density of materials which comprises a source element of gamma-rays of intermediate energy $\gamma$, a detector element for producing electrical signals upon reception of gamma-rays, heavy metal shielding means separating said elements having beveled surfaces adjacent said elements the geometrical projections of which intersect at a point in said material displaced from a straight line connecting said source element and detector element wherein gamma-rays from said source singly scattered in said material adjacent said point impinge said detector with energies within a band which is dependent upon the angle subtended by said projections and whose median energy $\gamma'$ is related to said angle by the expression $$\gamma' = \frac{\gamma}{1+\frac{\gamma}{mc^2}(1+\cos \phi)}$$

where $\phi$ is the angle subtended by said projections, and an energy selective measuring system connected to said detector element and selectively responsive primarily to signals corresponding to gamma-rays of energies within said band.

6. A well logging system for determining the density of materials in formations spaced laterally from the walls of a well bore comprising a source element of gamma-rays of intermediate energy $\gamma$ supported for movement along the length of said well bore, a detector element supported with and spaced a predetermined distance from said source element for producing electrical signals upon reception of gamma-rays, shielding means substantially encasing both said elements but having restricted apertures angularly directed towards the formations and arranged such that geometrical projections thereof intersect at points displaced from said well bore to define an active zone, wherein gamma-rays from said source singly scattered in said zone impinge said detector with energies within a band dependent upon the angle $\phi$ subtended by said projections which band is centered at an energy $\gamma'$ related to said angle by the expression $$\gamma' = \frac{\gamma}{1+\frac{\gamma}{mc^2}(1+\cos \phi)}$$

and an energy selective measuring system connected to said detector and adapted to accept for measurement primarily signals corresponding to gamma-rays of energy within said band.

7. A well logging system for determining the density of materials in formations adjacent the walls of a well bore comprising a gamma-ray source of intermediate energy $\gamma$ sharply collimated to form a primary beam of gamma-rays in said formations, means supporting said source for movement along the length of said well bore, a detector element supported with and spaced a predetermined distance from said source and sharply collimated to receive a secondary beam of gamma-rays of lower energy $\gamma'$, where the paths of said beams intersect to subtend an angle $\phi$, where $\phi$ is the supplement of the scattering angle $\theta$, and a measuring system connected to said detector and selectively responsive to signals corresponding to gamma-rays within a restricted energy band including the energy $\gamma'$, where $$\gamma' = \frac{\gamma}{1+\frac{\gamma}{mc^2}(1-\cos \theta)}$$

8. A well logging system for determining the density of materials in formations adjacent the walls of a well bore comprising a gamma-ray source of intermediate energy $\gamma'$, means for sharply collimating said source to form a cone-shaped beam of gamma-rays in said formations, means supporting said source for movement along the length of said well bore, a detector element supported with and spaced a predetermined distance from said source, means for sharply collimating said detector element to receive a cone-shaped beam of gamma-rays of lower energy $\gamma'$, where the paths of said beams intersect to subtend an angle $\phi$ where $\phi$ is the supplement of the scattering angle $\theta$, and a measuring system connected to said detector and selectively responsive to signals corresponding to gamma-rays within a restricted energy band including the energy $\gamma'$ where $$\gamma' = \frac{\gamma}{1+\frac{\gamma}{mc^2}(1-\cos \theta)}$$

9. A well logging system for determining the density of materials in an annular zone substantially symmetrical to a well bore comprising an element forming a source of gamma-rays of intermediate energy $\gamma$ supported for movement along the length of said well bore, a detector element supported with and spaced a predetermined distance from said source for producing electrical signals upon reception of gamma-rays, shielding means substantially encasing both said elements and having a conical-shaped aperture adjacent each of said elements whose geometrical projections intersect to define an active zone in which gamma-rays following single scattering will be within an energy band dependent upon and related to the angle $\phi$ subtended by said projections by the expression $$\gamma' = \frac{\gamma}{1+\frac{\gamma}{mc^2}(1+\cos\phi)}$$

where $\gamma'$ represents an energy level within said band, and a measuring system connected to said detector and adapted to accept for measurement primarily signals corresponding to gamma-rays of energy within said band.

10. A well logging system comprising an elongated pressure-bearing housing, a gamma-ray source of intermediate energy $\gamma$ at one end thereof, a detector element spaced substantially from said source, heavy metal cylinder means partially encasing said source and said detector axially of said housing, said cylinder means adapted to provide cone-shaped slots which intersect said source and detector and whose projections extend at an angle relative to the axis of said housing for intersection at a point displaced from said housing to define an active zone in which gamma-rays from said source are singly scattered and directed to said detector, cable means for supporting said unit for movement along said well bore and including a circuit connected to said detector, a measuring system connected to said circuit at the earth's surface and selectively responsive to signals from said detector corresponding to gamma-rays lying within a restricted energy band which includes energy $\gamma'$, where $$\gamma' = \frac{\gamma}{1+\frac{\gamma}{mc^2}(1-\cos\theta)}$$

where $\gamma$ is the energy of rays from said source and $\theta$ is the scattering angle of the gamma-rays in said zone.

11. A gamma-ray well logging system for determining the density of materials adjacent the walls of a well bore which comprises an elongated cylindrical housing, cable means including an electrical circuit supporting said housing for movement along the length of a well bore, a heavy metal cylindrical means supported within said housing and provided with at least two conical-shaped windows adjacent the ends thereof whose projections intersect at points outside said housing, a source of gamma-rays at the axis of said cylinder and in a first of said windows, a detector of gamma-rays at the axis of said cylinder and in the second of said windows, means for connecting said detector to said electrical circuit, and a measuring system connected to said cable means at the earth's surface and responsive to the output of said detector and further characterized by selectivity primarily responsive to gamma-rays in an energy band dependent upon and related to the angle $\phi$ between said projections by the expression $$\gamma' = \frac{\gamma}{1+\frac{\gamma}{mc^2}(1+\cos\phi)}$$

where $\gamma$ represents the energy level of gamma-rays from said source and where $\gamma'$ represents an energy level within said band.

12. The method of determining the character of a relatively small localized zone in an extensive unknown medium which comprises irradiating said zone with gamma-ray photons of known energy characteristics derived from a localized radiation source outside said medium, receiving photons scattered by said medium at a second localized zone spaced away from said radiation source, and selectively measuring the rate of occurrence of received photons having energy of approximately $E_2$, where $E_2$ is equal to $$\frac{E_1}{1+\frac{E_1}{mc^2}(1-\cos\theta)}$$

$E_1$ being the energy value in mev. of the highest-energy significant component of said irradiating photons, $mc^2$ being 0.511 mev., and $\theta$ being the angle having said first zone as its apex and defined by the relative locations of said first zone, said source, and said receiving zone.

13. The method of determining the character of a relatively small localized zone in an extensive unknown medium which comprises irradiating said zone with substantially monoenergetic gamma-ray photons derived from a localized radiation source outside said medium, receiving photons scattered by said medium at a second localized zone spaced away from said radiation source, and selectively measuring the rate of occurrence of received photons having energy of approximately $E_2$, where $E_2$ is equal to $$\frac{E_1}{1+\frac{E_1}{mc^2}(1-\cos\theta)}$$

$E_1$ being the energy value in mev. of said irradiating photons, $mc^2$ being 0.511 mev., and $\theta$ being the angle having said first zone as its apex and defined by the relative locations of said first zone, said source, and said receiving zone.

14. The method of determining the character of a relatively small localized zone within an extensive unknown medium which comprises transmitting into said medium in the direction of said zone a collimated beam of gamma-ray photons having energy in mev. in $E_1$, receiving at a second localized zone spaced away from said source photons scattered by said medium, and selectively measuring the rate of occurrence of received photons having energy approximately equal to $E_2$, where $E_2$ is equal to $$\frac{E_1}{1+\frac{E_1}{mc^2}(1-\cos\theta)}$$

$mc^2$ being equal to 0.511 mev. and $\theta$ being the angle having said first zone as its apex and being defined by the relative locations of said first zone, said source, and said receiving zone.

15. The method of determining the character of a localized small zone in an extensive medium which comprises irradiating said zone with gamma-ray photons having energy in mev. of $E_1$ and derived from a source spaced away from said zone, said source being dimensionally small in comparison to the size of said medium, directionally receiving at a second localized zone spaced away from said source photons scattered from said zone, said directional reception being along the axis joining said receiving zone and said first zone, selectively measuring the rate of occurrence of those received photons having energy approximately equal to $E_2$, where $E_2$ is equal to $$\frac{E_1}{1+\frac{E_1}{mc^2}(1-\cos\theta)}$$

$mc^2$ being 0.511 mev. and $\theta$ being the angle defined by the intersection of said receiving axis and the straight line between said radiation source and said first zone.

16. The method of determining a physical characteristic of a small localized zone in an extensive unknown medium comprising transmitting from a localized radiation source into said medium in the direction of said zone a collimated beam of gamma-ray photons having energy in mev. of $E_1$, directionally receiving photons scattered by said zone at a localized receiving zone spaced away from said source, said directional reception being along an axis passing through said first zone and intersecting with said beam, and selectively measuring the rate of occurrence of said received photons having energy in the neighborhood of $E_2$, $E_2$ being equal to $$\frac{E_1}{1+\frac{E_1}{mc^2}(1-\cos\theta)}$$

$mc^2$ being 0.511 mev., and $\theta$ being the angle having said first zone as its apex and being defined by the intersection of said direction of transmission and said direction of reception, the detected photons of energy $E_2$ being thereby limited to photons which have undergone single scattering in said first localized zone.

17. The method of determining a physical characteristic of a small localized zone in an extensive unknown medium comprising transmitting toward said zone a beam of gamma-ray photons from a localized radiation source outside said medium, said beam being characterized by a determined energy $E_1$, in mev., directionally receiving at a receiving zone spaced away from said source photons scattered from said medium, said directional reception being along the straight line between said receiving zone and said first zone, and selectively measuring the rate of occurrence of received photons having energies of approximately $E_2$, where $E_2$ equals $$\frac{E_1}{1+\frac{E_1}{mc^2}(1-\cos\theta)}$$

$mc^2$ being 0.511 mev., and $\theta$ being the angle having said first zone as its apex and being defined by the intersection of said direction of transmission and said direction of reception, the photons thus selectively measured being thereby limited to photons undergoing single scattering in said first zone.

18. In the art of gamma-gamma borehole logging that involves irradiating earth formations with gamma-rays emanating from a gamma-ray source situated within the borehole, and the detection and recordation of gamma-rays entering a detecting zone within the borehole and vertically spaced from the gamma-ray source; the improvement comprising said irradiation of the earth formations being with substantially monoenergetic gamma-rays, and limiting the recordation of detected gamma-rays to solely such gamma-rays having energies within a selected energy range that corresponds to the Compton-degraded quanta of source gamma-rays scattered through a range of angles within the earth formations.

No references cited.

ARCHIE R. BORCHELT, *Primary Examiner.*